INVENTOR
Harry E. Luebkemann

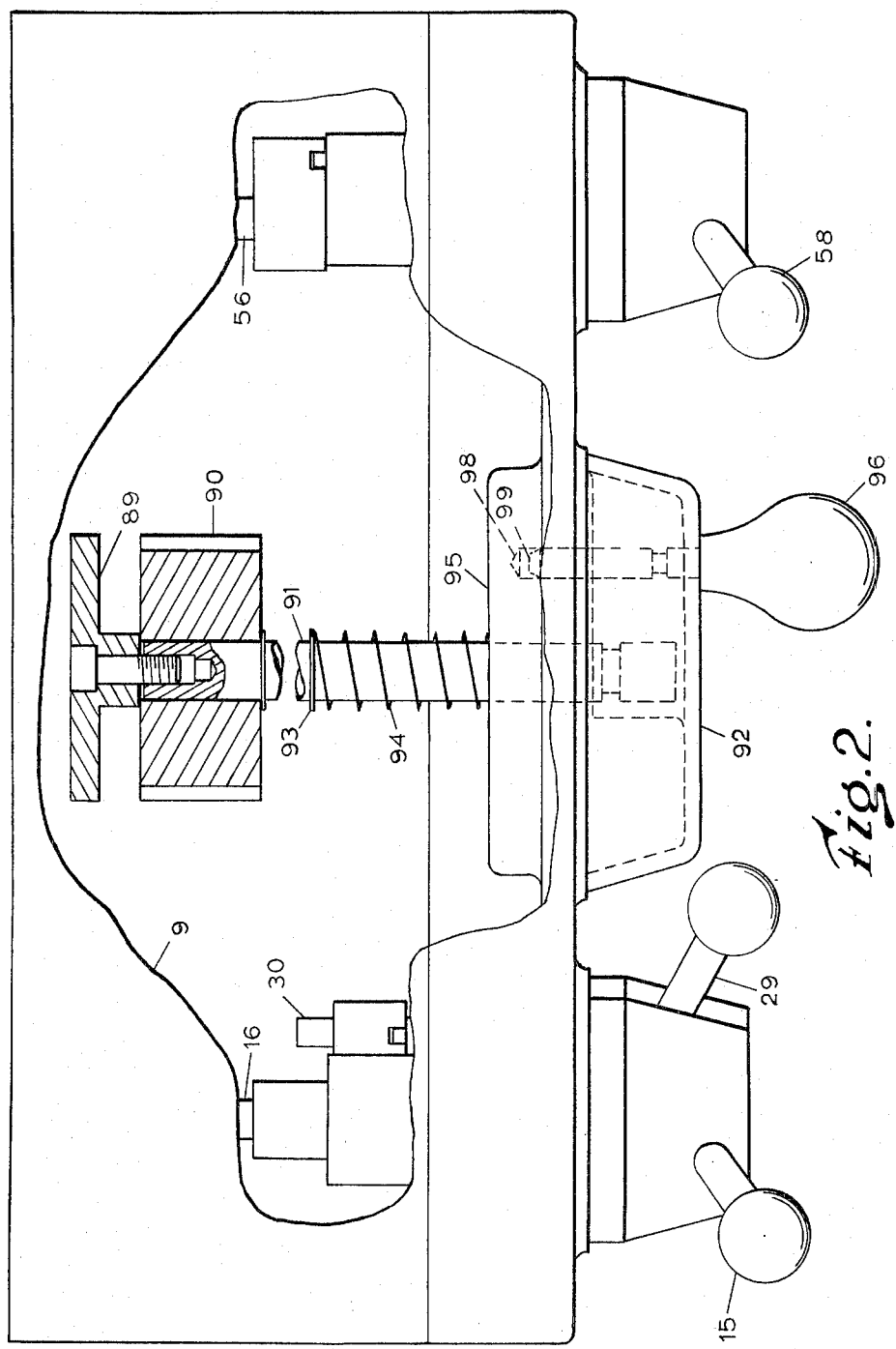

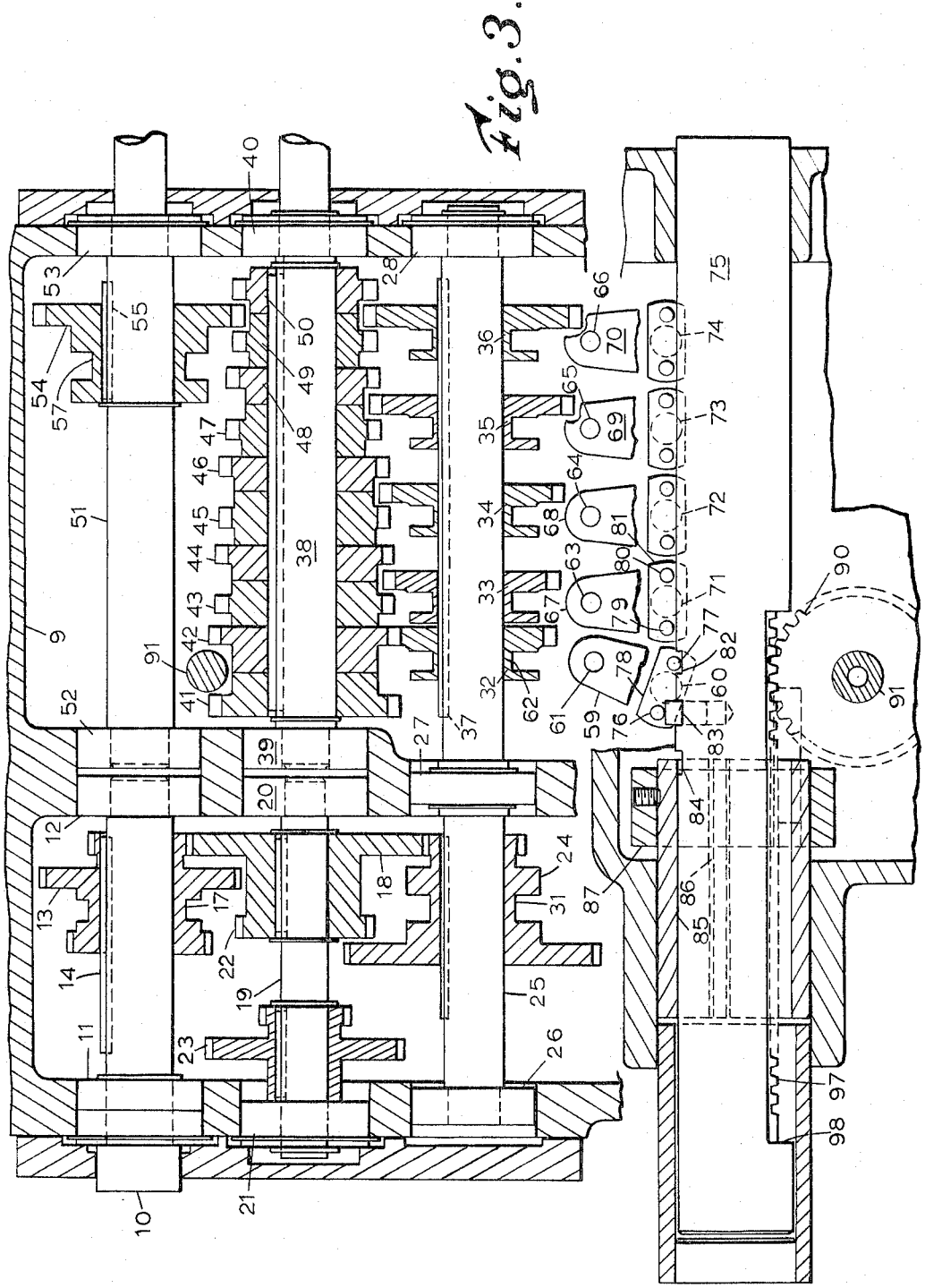

United States Patent Office 3,274,843
Patented Sept. 27, 1966

3,274,843
LATHE TRANSMISSION MECHANISM
Harry E. Luebkemann, Wilmington, Ohio, assignor to
The Cincinnati Milling Machine Co., Cincinnati, Ohio,
a corporation of Ohio
Filed May 18, 1964, Ser. No. 368,290
10 Claims. (Cl. 74—335)

This invention relates to a transmission mechanism and more particularly to a shifter mechanism especially suited for a quick change feed box in a lathe.

It is an object of this invention to provide a shifter mechanism for a lathe feed box which allows the feed gearing to be completely enclosed.

It is also an object to provide a mechanism by which one gear of a number of gears can be selected for shifting in a mechanical system by the setting of a rotary dial member.

It is a further object of this invention to provide a gear shifting mechanism to shift one of a plurality of gears while the other gears of the mechanism are positively prevented from being engaged.

Another object of this invention is the provision of a shifting mechanism for a lathe feed box having a cone of gears and a plurality of gears selectively engageable therewith, the gears being designed on increment-decrement gear principles, wherein each selected combination is made by the angular setting of a dial and the shifting of the gears into the selected combination is made by axial movement of the dial.

It is a further object of this invention to provide a lathe with an enclosed feed box in which feed speed changes can be made within a range of feeds by the simple rotary and axial manipulation of a single control member.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form this invention is utilized to shift any one of a number of gears slidable one way and the other at spaced locations along a drive shaft. Each of the shiftable gears is adapted to engage one or the other of a pair of gears fixed on a parallel output shaft, there being one pair of these gears for each of the shiftable gears. In order that the gears properly mesh but provide different drive ratios at each pair, the gears are designed and made in accordance with increment-decrement gear principles and practice. Each of the shiftable gears is engaged by a finger extending in a direction transverse to the drive shaft and each finger extends from one of a row of rocking shifters which swing around axes also transverse to the drive shaft from neutral positions so that by rocking a shifter from its neutral position a corresponding one of the gears is caused to move along the drive shaft. A control dial is provided and it is rotatable to a series of predetermined positions and an operating plunger is moved along the row of shifters to select only one for operation and to determine the direction in which it will be rocked. The plunger is also rotatable in one direction from a neutral position to an engaging position to effect swinging movement of the selected shifter in the predetermined direction to thereby engage a gear on the drive shaft with one on the output shaft.

A clear understanding of the construction and operation of the invention can be obtained from the following detailed description of a preferred embodiment, reference being made in the description to the attached drawings wherein:

FIG. 2 is a partial top plan view of the feed box enclosing the transmission of FIG. 1, the box being partly broken away and with a portion shown in section.

FIG. 3 is a section of FIG. 1 developed along the line 3—3 thereof, to show the operational relationships of the mechanism.

Figure 1:
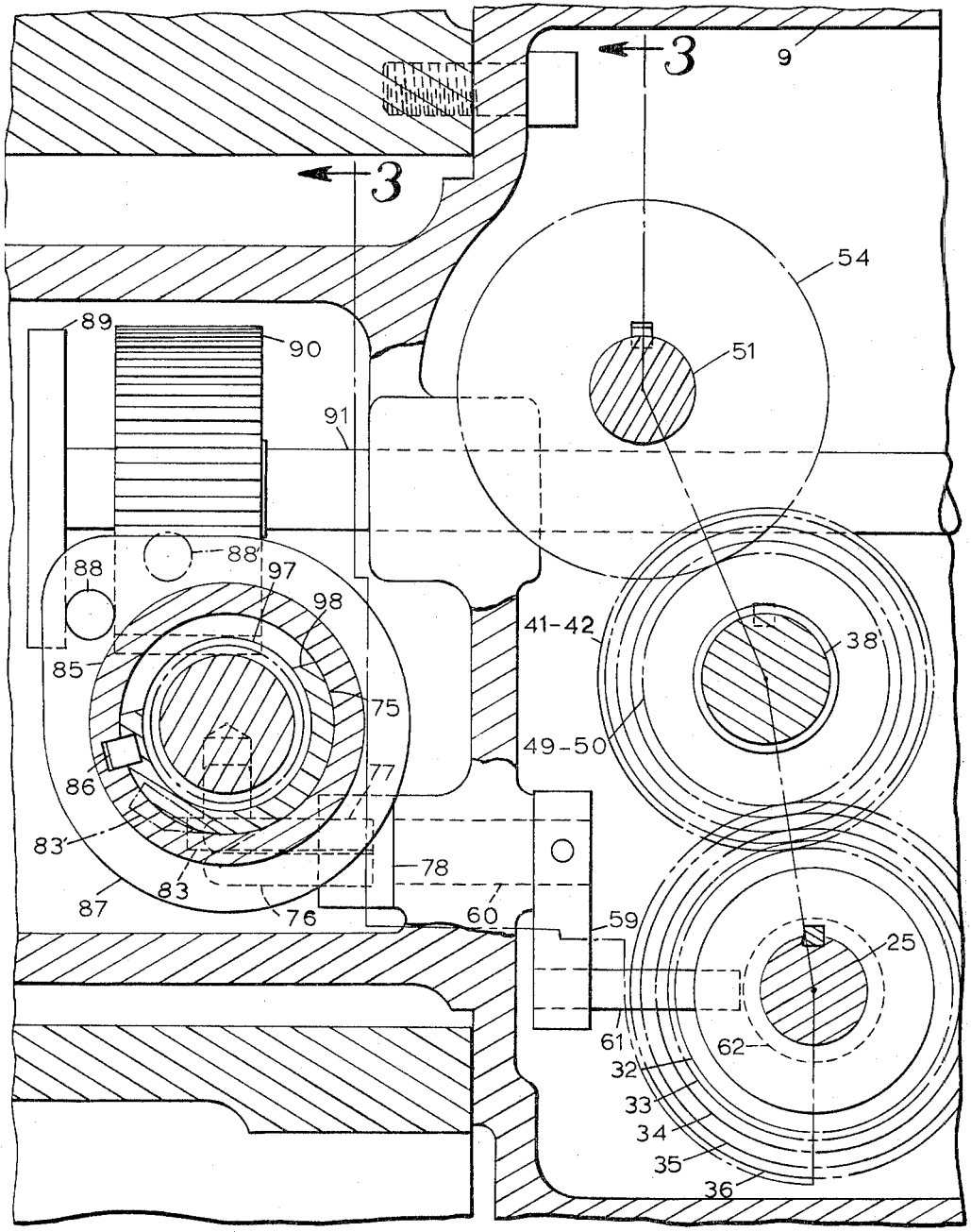
FIG. 1 is a partial section view showing the mechanism of a lathe quick change feed transmission.

As shown best in FIG. 3, the feed box exemplified herein includes a housing 9 having an input shaft 10 supported in bearings 11, 12 and to which a rotational drive from a power source (not shown) is coupled to rotate a gear member 13 that is rotatable with the shaft 10 by provision of a key 14. The gear is shiftable along the shaft 10 by operation of a shifter lever 15, FIG. 2, to which a pin 16 is attached in a position parallel with but eccentric from the axis on which the lever 15 is rotatable. The pin 16 extends into a neck 17 on the gear member 13 and therefore pulls that gear axially along the shaft 10. As shown, the gear member 13 is engaged with a gear 18 to transmit rotation to an intermediate shaft 19 received between bearings 20, 21 and on which the gear 18 is fixed. The gear member 13 might be shifted by the described lever 15 and eccentric pin 16 to engage either one of two other gears 22, 23 also fixed on the shaft 19 to provide two other drive ratios between the two shafts 10 and 19. The gear 18, as shown, is engaged by a gear member 24 rotatable with but slidable along a shaft 25 received in bearings 26, 27 and 28 in the housing 9. Another swingable lever 29 with a parallel but eccentric pin 30 attached thereto and engaged in a neck 31 provides a mechanism by which the gear member 24 can be selectively moved to engage a section of the gear 23 to alter the drive ratio between the shafts 19, 25.

The shaft 25 also has a set of gears 32–36 received thereover at spaced locations between the bearings 27 and 28. Each of the gears 32–36 is rendered rotatable with the shaft 25 by a key 37 that extends therealong and each is axially movable along the shaft 25. The shaft 25, for purposes of this disclosure, is termed the drive shaft while the gears 32–36 are driving gears thereon. A driven or output shaft 38 is received in bearings 39, 40 in the housing 9 for rotation on an axis spaced from but parallel to the drive shaft 25. A set of driven gears 41–50 is fixed on the output shaft 38 and these gears are arranged in pairs having a one or two tooth difference between gears of a pair. The shafts 25 and 38 are referred to herein as driving and driven shafts, respectively, for convenience of description and the terms are not intended to limit this disclosure or the claims following thereafter since it is recognized that a reversal of direction of drive will provide an equivalent structure within the intended scope of the present invention.

The gears of each pair on the shaft 38, for example gears 41, 42, are both adapted to be engaged by one of the gears 32–36, the gear 32 engaging with either the gear 41 or the gear 42 to provide a slightly different drive ratio between the shafts 25, 38. The gears 41, 42 and 32 are designed in accordance with increment decrement gear principles so that the gear 32 is properly engaged with either of the gears 41, 42. All of the other gears 43–50 and 33–36 are designed in the same manner so that proper meshing is achieved along the cone of gear pairs 41–50. As an example, the gears 41, 42 can both be gears having a 10.4 diametral pitch but gear 41 is an incremental gear of 27 teeth while the gear 42 is a standard gear of 28 teeth. The engaging driving gear 32 could properly be a standard gear of 10.4 diametral pitch and 24 teeth. The gear 44 can be a decremental gear of 10 diametral pitch and with 24 teeth while the gear 43 is an incremental gear of 26 teeth and 10 diametral pitch to provide a two tooth difference between those gears. The gear 33 would then be a 10 diametral pitch 24 tooth incremental gear to engage both of the gears 43, 44 properly. These gears are described by way of example only and the desired drive ratios together with a given shaft spacing between the shafts 25 and 38 will determine the gears to be used. Incremental and decremental gears can be cut with standard cutters from standard blanks but the blank is indexed one less or one more time, respectively, to form teeth thicker or thinner than standard teeth. The pitch diameter of an incremental gear when in mesh with a given gear is slightly smaller than that of a standard gear in mesh with the same gear and each tooth therefore has a longer addendum. Conversely, a decremental gear has a pitch diameter slightly greater than standard and each tooth has a shorter addendum. Thus, two gears rotatable on the same axis and which have a one or two tooth difference can be made for proper meshing with a third gear rotatable on a fixed parallel axis, the third gear being laterally movable for engagement with one or the other of the two gears.

With any one of the gears 32–36 engaged with a gear of the set of gears 41–50 on the shaft 38, the shaft 38 will be driven by the shaft 25 at a predetermined relative speed depending upon the ratio of the engaged gears. The shaft 38 is coupled in a lathe to a feed bar (not shown) to produce a feed motion of the cutting tool (also not shown) in the well known manner. In addition the shaft 38 can be connected to rotate another shaft 51 received between gearings 52, 53 in the housing 9. The shaft 51 extends through the housing 9 and bearing 53 for connection with the conventional lead screw (not shown) of a lathe. A gear 54 is received on the shaft 51 and is rendered rotatable therewith by a key 55. The gear 54 is slidable along the shaft 51 by a shifter pin 56 (FIG. 2) which extends into an annular groove 57 around the gear. The pin 56 is similar to the pins 16, 30 and is parallel with but eccentric from the axis on which a lever 58 on the front of housing 9 is rotatable. The lever 58 and pin 56 are connected together and therefore as the lever is rotated the gear 54 is moved along the shaft 51. The gear 51 is shown as disengaged but is movable by rotation of the lever 58 to engage the gear 50 on the shaft 38 when rotation of the lead screw shaft 51 is desired.

The gear 32 is shown shifted from its neutral position between the gears 41, 42 into engagement with the gear 42. The gear 32 is shifted by the rocking or swinging of a shifter member 59, shown in FIGS. 1 and 3, which is fixed to a shift 60 that is rotatably journalled in the housing 9 and is oriented transverse to shift 25. A shifter pin 61 is fixed in the member 59 and extends outward therefrom and into a neck 62 formed around the gear 32. Therefore, the rocking movement of the member 59 to the position as indicated in FIG. 3 moves the gear 32 to the position shown. Each of the other gears 33–36 is engaged by a pin 63–66, respectively, fixed in and extending from a series of rocking members 67–70. Each of these rocking members 67–70 is fixed on a shaft 71–74 and is movable one way and the other from the neutral position in which they are shown in FIG. 3 to move their respective gears 33–36 on the shaft 25.

Only one of the members 59, 67–70 is rotatable from its neutral position at any time to prevent simultaneous engagement of two or more of the driving gears 32–36 with the driven gears 41–50. To this end, a plunger 75 is received in the housing 9 parallel to the shaft 25 and it is both axially movable and rotatable. The axial position of the cylindrical plunger 75 determines the one of the shifter members 59, 67–70 to be rotated and the direction in which it is to be rotated. Rotation of the plunger 75 from its neutral, disengaged position to its engaging position then produces the rocking of the selected one of the members 59, 67–70 to engage its associated drive gear. The shifter member 59 has two pins 76, 77 that extend outward from a cross bar 78 attached to the shaft 60 at its end opposite to the shifter member 59. The pins 76, 77 are positioned such that they are in tangential contact with the cylindrical surface of the plunger 75 when the shifter member 59 is in its neutral position as are the pins 79, 80 extending from the cross bar 81 of the shaft 71 and shifter 67. As shown in FIG. 3, the plunger 75 has a notch 82 into which the pin 77 has moved when the member 59 is rocked clockwise to its engaging position to mesh the gear 32 with the gear 41. At the same time, the other pin 76 is lifted away from the plunger 75 by a cam 83 fixed in the plunger 75. One other notch 84 is formed in the plunger 75 but it is not in registration with any of the pins such as 76, 77 or 79, 80 at this time. It can therefore be seen that no other one of the members 67–70 can rotate from its neutral position due to the axial position of the plunger 75 at this time. Moreover, the member 59 can be rotated only in the clockwise direction to the position shown. The spacing of the notches 82, 84 and the cam 83 is such that only one of the pins 76, 77 can be in registration with one of the notches 82, 84 while the other is in contact with the cam 83, a condition necessary for rotation of the member 59 and similarly any of the other members 67–70. The spacing between the pin 77 and the next adjacent pin 79 is less than the spacing from the cam 83 to either of the notches 82, 84 in the plunger 75. Therefore, if the plunger 75 is shifted rightward to bring the notch 84 and cam 83 into registration with the pins 76 and 77, respectively, the notch 82 would be between the pins 79, 80 and the member 67 could not be rocked from its neutral position. The spacing of the members 59, 67–70 is uniform and therefore the operation of one only of them is possible for any axial position in which the plunger has one of its notches 82, 84 and its cam 83 in registration with the pin 76, 77, 79, 80 and others identical thereto associated with the rocking members 68–70.

As shown in FIGS. 1 and 3, the plunger 75 has been rotated to its engaging position. As shown in FIG. 3, the cam 83 is trapezoidal in longitudinal section and when rotated with the plunger 75 to the position 83', it is moved away from the pin 76. At the same time the notch 82 is rotated away from the pin 77 and both the pins 76 and 77 contact the cylindical outer surface of the plunger 75, in which condition, the shifter member 59 is rotated to its neutral position. The notches 82, 84 and cam 83 cannot interfere with axial movement of the plunger 75. A sleeve 85 is rotatably received in the housing 9 and the plunger 75 is axially movable therethrough but is rotatable therewith by reason of a key 86 between the plunger 75 and sleeve 85. A collar 87 is fixed around the sleeve 85 and a pin 88 is fixed therein at a location spaced from the sleeve 85 but in axial alignment therewith. The pin is embraced between a flange 89 and a pinion 90 both fixed on a shaft 91 that extends into the housing 9 from the front thereof. The shaft 91 is both rotatable and axially movable in the housing 9. The outer end of the shaft 91 has a dial 92 fixed thereon. A snap ring 93 is received around the shaft 91 and a compressed spring 94 is received between the ring 93 and a boss 95 in the front of the housing 9 behind the dial 92. The spring 94 constantly urges the shaft 91 rearward in the housing until stopped by the dial 92. In this position, the flange 89 and pinion 90 hold the pin 88 in such a position that the collar 87 is rotated to the position shown, in which position it causes the plunger 75 to be rotated to its engaging position. A handle 96 is provided on the dial 92 and the machine operator can grasp it and pull the shaft 91 outward to rotate the pin 88 up to the position 88' wherein the collar 87 is similarly rotated along with the plunger 75 to the condition wherein both notches 82, 84 and the cam 83 are moved away from the pins 76, 77 and the plunger 75 can be moved axially to a new position to select another of the shifters 67–70 for rocking in a particular direction.

The pinion 90 in the shaft 91 is engaged at all times with a cylindrical rack 97 received inside the plunger 75, the rack 97 having annual teeth extending therearound and exposed to the pinion 90 through a cut-out portion 98 of the plunger 75. Since the plunger 75 and rack 97 are fixed together, rotation of the shaft 91 and pinion 90 will result in axial movement of the plunger 75. Rotation of the shaft 91 is possible by rotation of the dial 92 when the shaft 91 is pulled forward as described. The dial 92 can be calibrated to indicate the combination of gears 32–36 and 41–50 selected for each predetermined angular position thereof. The positions of the dial corresponding to the various gear combinations and to the calibration markings are accurately defined by sockets 98 into which a pin 99 carried by the dial 92 fits when in alignment therewith. Thus, the shaft 91 can only be shifted by the spring to the position shown when the pin 99 is in registration with one of the sockets 98 and the dial 92 cannot be rotated until the shaft 91 is pulled outwardly against the bias of the spring 94. Release of the dial 92 to allow the spring 94 to return the shaft 91 to the position shown effects rotation of the plnuger 75 to its engaging position when the pin 99 is aligned with a socket 98 and a selected one of the gears 32–36 is moved in a predetermined axial direction from its neutral position.

From the foregoing detailed description it can be seen that one only of the gears 32–36 can be engaged at any one time and that selection of the one gear is made in accordance with the axial position of the plunger 75. Further, the direction in which that one gear is shifted is also a function of the axial position of the plunger 75 although the shifting thereof is accomplished by rotation of the plunger 75. Axial movement of the plunger 75 is provided by rotation of the dial 92 and rotation of the plunger 75 is provided by shifting the dial 92 along its axis of rotation. While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:

1. In a transmission, a gear shifting mechanism for movement of a selected one of a plurality of gears along a shaft from and back to a neutral position comprising in combination:
   (a) a control member axially movable parallel to the shaft and rotatable from a neutral angular position to an engaging angular position,
   (b) a set of shifter members connected, respectively, to said gears, each of said shifter members operable to move the gear connected thereto along the shaft,
   (c) actuating means on said control member and positionable therewith for operating a selected one of said shifter members in accordance with the axial position of said control member and upon rotation thereof from the neutral angular position,
   (d) selection means for axially positioning said control member along the shaft to position said actuating means in registration with one of said shifter members, and
   (e) means for rotating said control members from the neutral angular position thereof to the engaging angular position when said actuating means is in registration with one of said shifter members.

2. The gear shifting mechanism of claim 1 wherein:
   (a) each of said shifter members is swingably supported adjacent to the respective ones of said gears and is connected thereto for movement thereof along the shaft when each of said shifter members is pivotally swung from a neurtal position,
   (b) each of said shifter members includes a pair of spaced parallel pins extending therefrom transversely across and in close proximity to said control member, and
   (c) said actuating means is adapted for engaging and lifting one of said pins away from said control member when said control member is rotated after axial positioning of said control member along said shaft to move said actuating means into registration with said one of the pins whereby the corresponding one of said shifter members is pivoted from the neutral position thereof.

3. The gear shifting mechanism of claim 2 wherein:
   (a) said control member is cylindrically shaped,
   (b) said actuating means is a cam extending outward from said control member, and
   (c) said control member includes a notch therein on each side of said cam and spaced therefrom a distance corresponding to the spacing between said pins of each shifter members to provide clearance for one of said pins of a shifter member when each shifter member is swung by a raised movement of the other of said pins thereof.

4. In a transmission having a plurality of pairs of first gears fixed on a first shaft and a second set of gears each axially movable on a second shaft parallel to the first shaft and adapted to engage one and the other of the gears of a pair of first gears when shifted one way and the other from a neutral position, a shifting mechanism comprising:
   (a) a control member axially movable parallel to said second shaft and rotatable from a neutral position to an engaging position,
   (b) a set of shifter members connected, respectively, to said second gears, each of said shifter members operable to move the one of the second gears connected thereto along the second shaft,
   (c) actuating means on said control member for operating said shifter members one at a time to move the second gears from the neutral positions thereof upon movement of said actuating means to a position in registration with said shifter members and rotation thereof,
   (d) selection means for axially positioning said control member along the second shaft to position said actuating means in registration with one of said shifter members, and
   (e) means for rotating the control member from the neutral position thereof to the engaging position when said actuating means is in registration with one of said shifter members.

5. In a transmission having a housing enclosing a plurality of pairs of driven gears fixed on an output shaft and a plurality of driving gears each axially movable on a drive shaft parallel to the output shaft and adapted to engage one and the other of the driven gears of a pair when shifted one way and the other from a neutral position, a shifting mechanism comprising:
   (a) a control plunger rotatably supported in the housing and axially movable parallel to said drive shaft, said control plunger rotatable on the longitudinal axis thereof from a neutral position in one direction to an engaging position, (b) a set of shifter members swingably received in the housing at spaced location and adjacent to said driving gears, each of said shifter members connected to the driving gear adjacent thereto and swingable to move said adjacent driving gear along the drive shaft, (c) actuating means on said control plunger for swinging one of said shifter members in a predetermined direction corresponding to the axial position of said control plunger when said control plunger is rotated to the engaging position thereof, (d) selection means for axially positioning said control plunger along the drive shaft, and (e) means for rotating the control member from the neutral position to the engaging position when said control plunger is axially positioned by said selection means to present said actuating means to one of said shifter members.

6. The mechanism of claim 5 wherein:

(a) each of said shifter members includes a pair of spaced parallel pins extending therefrom transversely across said control plunger on one side thereof, and (b) said actuating means is adapted for engaging and lifting one of said pins away from said control plunger upon rotation thereof to swing the shifter member from which the engaged pin extends, the direction of swing of the shifter member being dependent upon the one of the pins engaged.

7. The mechanism of claim 6 wherein:

(a) the pins of each of said pairs of pins extend across said control plunger in close proximity thereto to hold each of said shifter members in a position maintaining the drive gear connected thereto in the neutral position thereof, (b) said actuating means includes a cam extending outward from said control plunger and alignable with each of said pins by axial movement of said control plunger, said cam swinging with rotation of said control plunger to lift the pin aligned therewith away from said control plunger, and (e) notches are formed in said plunger on each side of said cam and spaced therefrom a distance corresponding to the spacing of the pins of each pair to provide clearance into the plunger for the other pin of each of said pairs when the respective shifter member is swung to shift the drive gear connected thereto to the engaged position.

8. In a transmission having a housing enclosing a plurality of pairs of gears fixed on a first shaft and a plurality of gears each axially movable on a second shaft parallel to the first shaft and adapted to engage one and the other of the gears of a pair of the gears on the first shaft when shifted one way and the other from a neutral position, a shifting mechanism comprising:

(a) a control plunger rotatably supported in the housing and axially movable parallel to said second shaft, said control plunger rotatable on the longitudinal axis thereof from a neutral position in one direction to an engaging position, (b) a set of shifter members swingably received in the housing at spaced locations and adjacent respectively to the gears on the second shaft, each of said shifter members connected to the gear adjacent thereto and swingable to move said adjacent gear along the second shaft, (c) actuating means on said control plunger for swinging one of said shifter members in a predetermined direction corresponding to the axial position of said control plunger when said control plunger is rotated to the engaging position thereof, (d) a control shaft supported in the housing for rotation and limited axial movement, (e) first means for connecting said control plunger to said control shaft for axial movement when said control shaft is rotated, (f) second means for connecting said control plunger to said control shaft for rotation when said control shaft is axially moved, (g) bias means for urging said control shaft to a predetermined position in said housing to hold said control plunger in the engaging position thereof, and (h) means for axially moving said control shaft against said bias means to rotate asid control plunger to the neutral position thereof and thereafter to rotate said control shaft to axially shift said plunger along the second shaft.

9. The mechanism of claim 8 wherein:

(a) said second connecting means includes a toothed rack integral with said control plunger and a pinion fixed on said control shaft and engaged with said rack, and (b) said first connecting means includes a crank pin attached to said control plunger and coaxial therewith and a flange on said control shaft spaced from said pinion, said crank pin extending to a location between said flange and pinion whereby said crank pin is laterally shifted by axial movement of said control shaft to effect rotation of said control plunger.

10. In a transmission housing enclosing a plurality of pairs of driven gears fixed on an output shaft and a plurality of driving gears each axially movable on a drive shaft parallel to the output shaft and adapted to engage one and the other of the driven gears of a pair when shifted one way and the other from a neutral position, a shifting mechanism comprising:

(a) a cylindrical control plunger rotatably supported in the housing and axially movable parallel to said drive shaft, said control plunger rotatable in one direction to an engaging position from a neutral position, (b) a set of shifter members swingably received at spaced locations in said housing adjacent said driving gears, (c) means for connecting each of said shifter members to the driving gear adjacent thereto for movement thereof along the drive shaft when the shifter member is rotated, (d) a pair of spaced parallel pins extending from each of said shifter members transversely across said control plunger on one side thereof and in close proximity thereto to hold the driving gear connected thereto in the neutral position thereof, (e) a cam extending outward from said control plunger, said cam alignable with each pin of said pairs by axial movement of said control plunger and adapted to rotate with said control plunger into contact with the pin in alignment therewith to swing the respective one of said shifter members, (f) a pair of notches in said control plunger, one of said notches on each side of said cam and spaced therefrom a distance corresponding to the spacing of the pins of said pairs, said notches providing clearance for the other pin of each of said pairs when the respective shifter member is swung to shift the drive gear connected thereto to one of the engaged positions thereof, (g) a control shaft supported in the housing for rotation and limited axial movement, (h) a toothed rack integral with said control plunger, (i) a pinion fixed on said control shaft and engaged with said rack, (j) a crank pin fixed to said control plunger and coaxial therewith, (k) a flange on said control shaft and spaced from said pinion, said crank pin extending into the space therebetween, (l) bias means for urging said control shaft axially to a predetermined position in said housing to laterally shift said crank pin and rotate said control plunger to the engaging position thereof, and (m) means for axially moving said control shaft against said bias means to rotate said control plunger to the neutral position thereof and thereafter for rotating said control shaft to axially shift said plunger along the drive shaft.

References Cited by the Examiner

UNITED STATES PATENTS

| | | | |
|---|---|---|---|
| 2,466,814 | 5/1949 | Le Blond et al. | 74—473 |
| 2,778,237 | 1/1957 | Romi | 74—342 |
| 2,826,930 | 3/1958 | Lautenbach | 74—335 |
| 2,986,950 | 6/1961 | Gerber | 74—473 |

DAVID J. WILLIAMOWSKY, *Primary Examiner.*

H. S. LAYTON, *Assistant Examiner.*